Aug. 27, 1940.   H. A. SOLOMON   2,212,755
HANDLING DEVICE
Filed Nov. 21, 1938
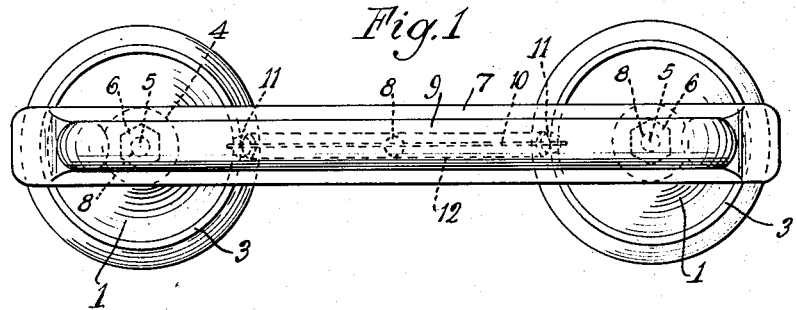
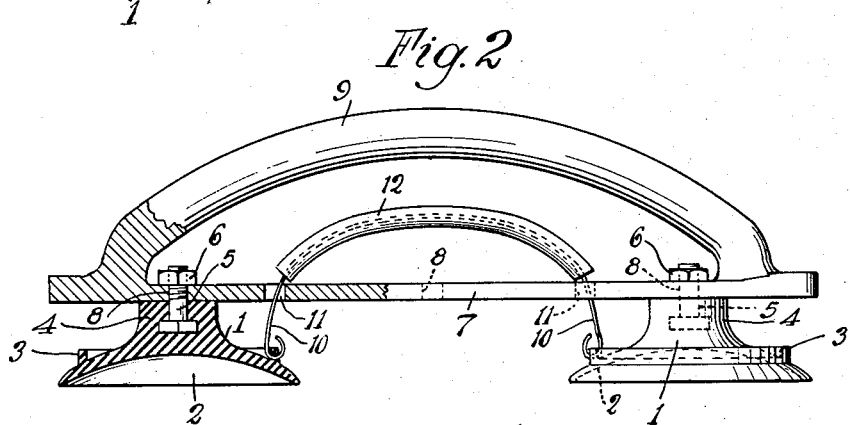
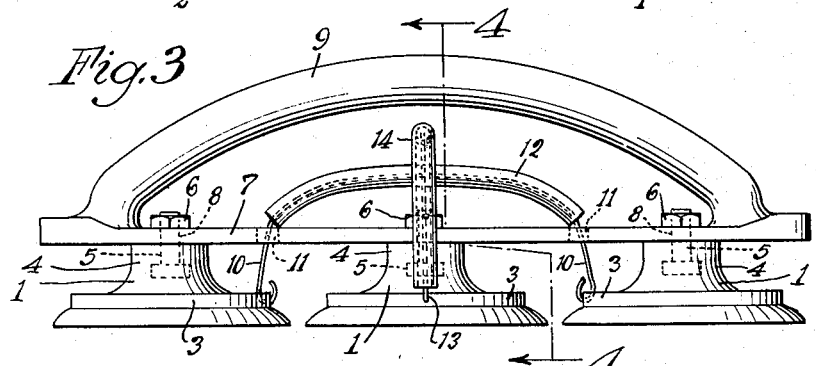
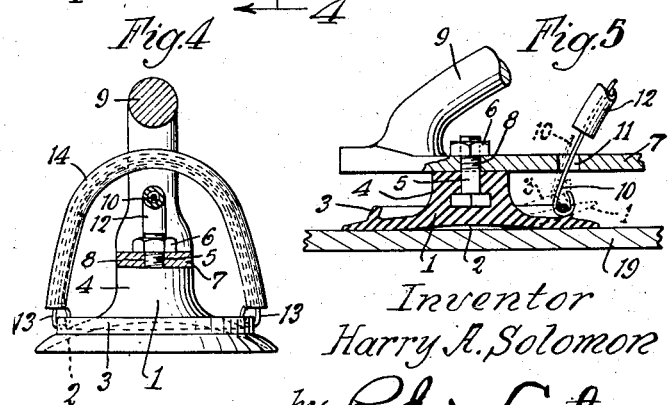
Inventor
Harry A. Solomon
by Parker & Carter
Attorneys.

Patented Aug. 27, 1940

2,212,755

UNITED STATES PATENT OFFICE 2,212,755

HANDLING DEVICE

Harry A. Solomon, Syracuse, N. Y.

Application November 21, 1938, Serial No. 241,569

1 Claim. (Cl. 294—64)

This invention relates to a means for lifting material having preferably plain surfaces, and it has for one object to provide a vacuum or suction-lifting mechanism and a handle therefor and convenient means for breaking the suction without letting go of the handle. Another object is to provide a convenient means for using a plurality of suction cups and for simultaneously breaking the suction of all of them without letting go of the handle.

Other objects will appear from time to time throughout the specification and the claim.

The invention is illustrated more or less diagrammatically in the accompanying drawing, wherein:

Figure 1 is a plan view of one form of the device;

Figure 2 is a side view with parts in section and parts broken away;

Figure 3 is a side view of a modified form;

Figure 4 is a transverse vertical section taken at line 4—4 of Figure 3;

Figure 5 is a sectional detail with parts in elevation showing the operation of breaking the seal by lifting an edge of a suction cup.

Like parts are designated by like characters throughout the specification and the drawing.

While suction cups of many designs might be used, it will ordinarily be preferable to use suction cups of a single design no matter how many are associated together. As thus shown, the cup comprises a main body 1 preferably arcuate or curved to provide a hollow 2. The cup may have a raised ridge 3 running about it. This is not essential, but it furnishes a convenient place to attach an edge-raising means. Integral with the cup is a reduced hub-like portion 4, in which an attaching means 5 is positioned. As here shown, the member 5 is a bolt threaded to receive an attaching nut 6. As shown in Figures 1 and 2, a cup-receiving portion 7 is provided with the necessary number of perforations 8, and in one or more of these perforations 8 the bolts 5 of the desired number of cups are positioned. The nuts 6 hold them in place. As shown in Figure 2, there is a third perforation 8, which might or might not be used to attach a third cup.

As a part of the member 7 and preferably integral with it is a handle 9. This serves as the handle of the tool as a whole.

Secured to the cups and preferably to the raised portion 3 of each of them is a wire 10. This passes through suitable perforations 11, 11 and lies above the member 7, and, in general, may conform to the shape of the handle portion 9. A rubber or other tube or shielding member 12 may be positioned upon the wire 11.

In the modified form of Figure 3 the handle assembly and parts are the same as those described for Figure 2. A third cup has been positioned between the two end cups, and the wire 10 passes through the perforations 11. Since there is a third cup, means must be provided for breaking the suction of that cup, and this is accomplished by a wire 13 secured to the member 3 and passing over the handle portion 7 and below the handle portion 9. It might pass above or below the wire 10, but, as here shown, it passes above it. A tubular shield 14 is provided for it.

In general, the device may be used to lift or to engage any surface upon which by reason of its shape and finish and condition the cups can engage. As shown in Figure 6, the surface 19 is engaged by one of the cups; and as shown in dotted lines of that figure, the wire 10 has been manipulated to lift one edge of the cup to break the suction or vacuum.

Although I have shown an operative form of my device, it will be understood that many changes in the form, shape and arrangement of parts might be made without departing from the spirit of my invention, and I wish that my showing be taken as in a sense diagrammatic.

The device, in any of the forms shown, is used generally as follows:

It is placed so that the edges of the suction cups, whether one or more, engage the surface of an article to be handled. Ordinarily, such articles will have plain surfaces aand relatively smooth surfaces, but certain curved surfaces— both concave and convex—can be engaged. Therefore, whatever surface is contacted, the device is depressed to expel the air from the cups and to establish the necessary suction. When that has been done, the device engages the surface tightly, and the article to which the device is now engaged can be moved either by lifting bodily or by pulling, or both. The device is readily usable for putting sheets of material into containers or removing sheets of material from containers. Another frequent use is in feeding sheets of material to presses and other forming tools, and devices such as punch presses and the like.

The device may, of course, be used on any article that has a surface that it can engage tightly enough to permit of the establishment of effective vacuum within the cup or cups. When this has been done, the article to which the device is now attached may be moved in any desired manner. While ordinarily it will be moved by hand, it may, of course, be moved otherwise, and the handle, instead of being merely fixed by the hand of an operator, may be engaged upon a hook or other part of a derrick or mechanical lifting or moving device of any sort.

I claim:

A manually manipulated handling device of the type described comprising a handle having depending end portions, a suction cup secured to each end portion, a release member extending below said handle in parallel relation thereto, said release member having depending end portions secured to the peripheral edge of said cups respectively, said release member being movable toward the handle by engagement with one finger while the handle is gripped by the hand, and being operable upon such movement to simultaneously flex the edge of both of said cups out of engagement with the surface to which they are secured.

HARRY A. SOLOMON.